United States Patent
Samyn et al.

(10) Patent No.: US 10,752,072 B2
(45) Date of Patent: Aug. 25, 2020

(54) ELECTRIFIED VEHICLE WITH VIBRATION ISOLATOR WITHIN FRAME AND CORRESPONDING METHOD

(71) Applicant: Ford Global Technologies, LLC, Dearborn, MI (US)

(72) Inventors: Andrew Charles Samyn, Dearborn, MI (US); Jeffrey Ronald Bohmer, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/122,166

(22) Filed: Sep. 5, 2018

(65) Prior Publication Data

US 2020/0070610 A1     Mar. 5, 2020

(51) Int. Cl.
- *B60K 1/04*     (2019.01)
- *B60G 13/00*    (2006.01)
- *F16F 9/54*     (2006.01)
- *B60L 50/60*    (2019.01)

(52) U.S. Cl.
CPC ........... *B60G 13/003* (2013.01); *B60L 50/66* (2019.02); *F16F 9/54* (2013.01); *B60G 2204/128* (2013.01); *B60G 2204/41* (2013.01); *B60K 2001/0438* (2013.01); *B60Y 2400/48* (2013.01)

(58) Field of Classification Search
CPC .................................. B29C 44/06; B60K 1/04
See application file for complete search history.

(56) References Cited

U.S. PATENT DOCUMENTS

| | | | |
|---|---|---|---|
| 4,969,662 A | 11/1990 | Stuart | |
| 6,151,930 A | 11/2000 | Carlson | |
| 6,460,662 B2 | 10/2002 | Niaura et al. | |
| 7,097,794 B2 * | 8/2006 | McLeod | B29C 44/18 264/275 |
| 8,344,526 B2 | 1/2013 | Bhat et al. | |
| 8,614,518 B2 | 12/2013 | Li et al. | |
| 9,884,545 B1 | 2/2018 | Addanki et al. | |
| 2011/0180336 A1 | 7/2011 | Kurata | |
| 2012/0160583 A1 * | 6/2012 | Rawlinson | F41H 7/042 180/68.5 |
| 2013/0162075 A1 | 6/2013 | Chinavera et al. | |
| 2013/0192914 A1 | 8/2013 | Nakamori | |
| 2014/0284125 A1 | 9/2014 | Katayama et al. | |
| 2014/0329125 A1 | 11/2014 | Miyanaga et al. | |
| 2015/0239331 A1 | 8/2015 | Rawlinson et al. | |

(Continued)

FOREIGN PATENT DOCUMENTS

| CN | 104829877 A | 8/2015 |
|---|---|---|
| CN | 105164447 A | 12/2015 |

(Continued)

*Primary Examiner* — James A Shriver, II
*Assistant Examiner* — James J Triggs
(74) *Attorney, Agent, or Firm* — David B. Kelley; Carlson, Gaskey & Olds, P.C.

(57) ABSTRACT

This disclosure relates to an electrified vehicle with a vibration isolator within a frame of the vehicle and a corresponding method. An electrified vehicle according to this disclosure includes a frame with a rail, a vibration isolator within the rail, and a battery pack connected to the rail by way of the vibration isolator. Among other benefits, mounting the vibration isolator within the rail increases the amount of available packaging space.

16 Claims, 4 Drawing Sheets

(56) References Cited

U.S. PATENT DOCUMENTS

| | | |
|---|---|---|
| 2016/0129806 A1 | 5/2016 | Yagami |
| 2016/0226041 A1 | 8/2016 | Jackson et al. |
| 2017/0025902 A1 | 1/2017 | Yuasa |
| 2017/0320381 A1* | 11/2017 | Milton ............... B60K 1/04 |

FOREIGN PATENT DOCUMENTS

| | | |
|---|---|---|
| EP | 2340951 A2 | 7/2011 |
| JP | 2016105361 A | 6/2016 |

* cited by examiner

ELECTRIFIED VEHICLE WITH VIBRATION ISOLATOR WITHIN FRAME AND CORRESPONDING METHOD

TECHNICAL FIELD

This disclosure relates to an electrified vehicle with a vibration isolator within a frame of the vehicle and a corresponding method. In particular, a battery pack is mounted to the frame by way of the vibration isolator.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles in that electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

An electrified vehicle according to an exemplary aspect of the present disclosure includes, among other things, a frame including a rail, a vibration isolator mounted within the rail, and a battery pack connected to the rail by way of the vibration isolator.

In a further non-limiting embodiment of the foregoing electrified vehicle, the vibration isolator includes a damper.

In a further non-limiting embodiment of any of the foregoing electrified vehicles, the rail includes an access hole adjacent the vibration isolator, and the electrified vehicle further comprises a panel coupled to the rail to close the access hole.

In a further non-limiting embodiment of any of the foregoing electrified vehicles, the vibration isolator is mounted to the panel.

In a further non-limiting embodiment of any of the foregoing electrified vehicles, the electrified vehicle includes a plate projecting from the panel, and the vibration isolator is mounted to the plate.

In a further non-limiting embodiment of any of the foregoing electrified vehicles, the vibration isolator includes a damping portion, an inner bushing, and an outer bushing, and the outer bushing includes a section connected to the plate.

In a further non-limiting embodiment of any of the foregoing electrified vehicles, the electrified vehicle comprises a fastener, and the battery pack is connected to the vibration isolator by way of the fastener.

In a further non-limiting embodiment of any of the foregoing electrified vehicles, the fastener projects through a clearance slot formed in the rail.

In a further non-limiting embodiment of any of the foregoing electrified vehicles, the battery pack includes a housing having a tab in contact with the fastener.

In a further non-limiting embodiment of any of the foregoing electrified vehicles, the vibration isolator includes a plate generally opposite the tab, and a nut threaded onto the fastener abuts against the plate.

In a further non-limiting embodiment of any of the foregoing electrified vehicles, the rail includes a length, a width, and a height, and the clearance slot is formed in a surface extending in a direction of the width of the rail.

In a further non-limiting embodiment of any of the foregoing electrified vehicles, an exterior surface of the rail includes a recess adjacent the clearance slot such that the rail exhibits a reduced height adjacent the clearance slot.

In a further non-limiting embodiment of any of the foregoing electrified vehicles, the tab is at least partially within the recess.

In a further non-limiting embodiment of any of the foregoing electrified vehicles, the frame includes two rails on opposite sides of the electrified vehicle, each of the rails includes at least two vibration isolators mounted therein, and the battery pack is connected to the rails by way of the respective vibration isolators.

A method according to an exemplary aspect of this disclosure includes, among other things, mounting a battery pack to a rail of a vehicle frame by way of a vibration isolator within the rail.

In a further non-limiting embodiment of the foregoing method, the mounting step includes inserting the vibration isolator into the rail through an access hole formed in the rail.

In a further non-limiting embodiment of any of the foregoing methods, the method further includes covering the access hole with a panel, the vibration isolator mounted to the panel.

In a further non-limiting embodiment of any of the foregoing methods, the method further includes arranging a fastener through a clearance slot in the rail, the fastener connected to the vibration isolator and the battery pack.

In a further non-limiting embodiment of any of the foregoing methods, the method further includes arranging the fastener adjacent a recess formed in an exterior surface of the rail.

In a further non-limiting embodiment of any of the foregoing methods, the method further includes arranging a tab of the battery pack at least partially within the recess.

DETAILED DESCRIPTION

This disclosure relates to an electrified vehicle with a vibration isolator within a frame of the vehicle and a corresponding method. In a particular example, an electrified vehicle according to this disclosure includes a frame with a rail, a vibration isolator mounted within the rail, and a battery pack connected to the rail by way of the vibration isolator. Mounting the vibration isolator within the rail increases available packaging space, which would otherwise have been occupied by the vibration isolator had the vibration isolator been mounted outside the rail. These and other benefits will be appreciated from the following description.

Figure 1:
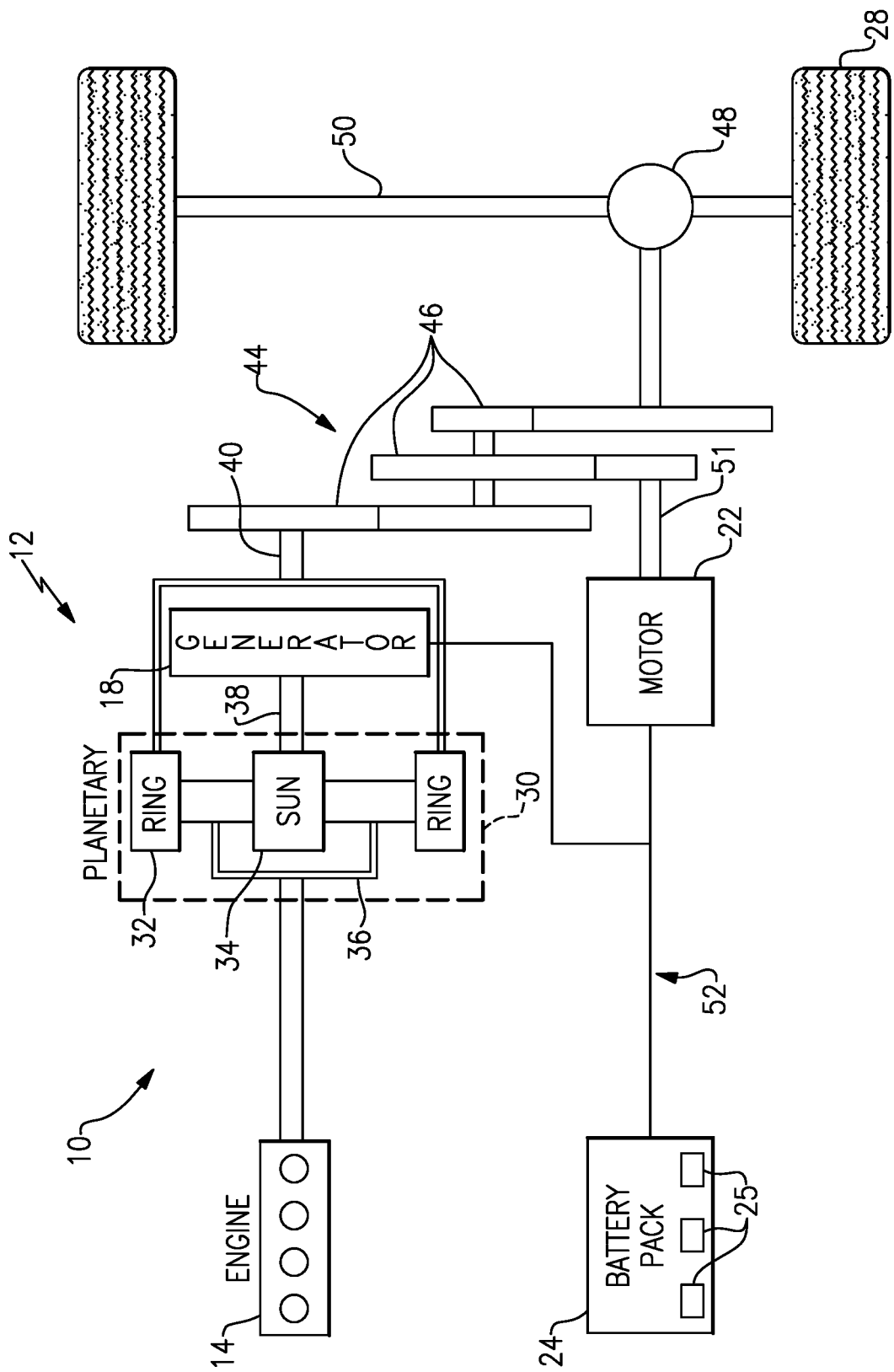
FIG. 1 schematically illustrates a powertrain of an electrified vehicle.

Referring to the drawings, FIG. 1 schematically illustrates a powertrain 10 for a motor vehicle, which in this example is an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, plug-in hybrids, and battery electric vehicles. This disclosure also extends to motor vehicles that are not electrified vehicles, including motor vehicles having only an internal combustion engine.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 51 that is also connected to the second power transfer unit 44. In one embodiment, the motor 22 and the generator 18 cooperate as part of a regenerative braking system in which both the motor 22 and the generator 18 can be employed as motors to output torque. In another example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12 via an electrical distribution system 52. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
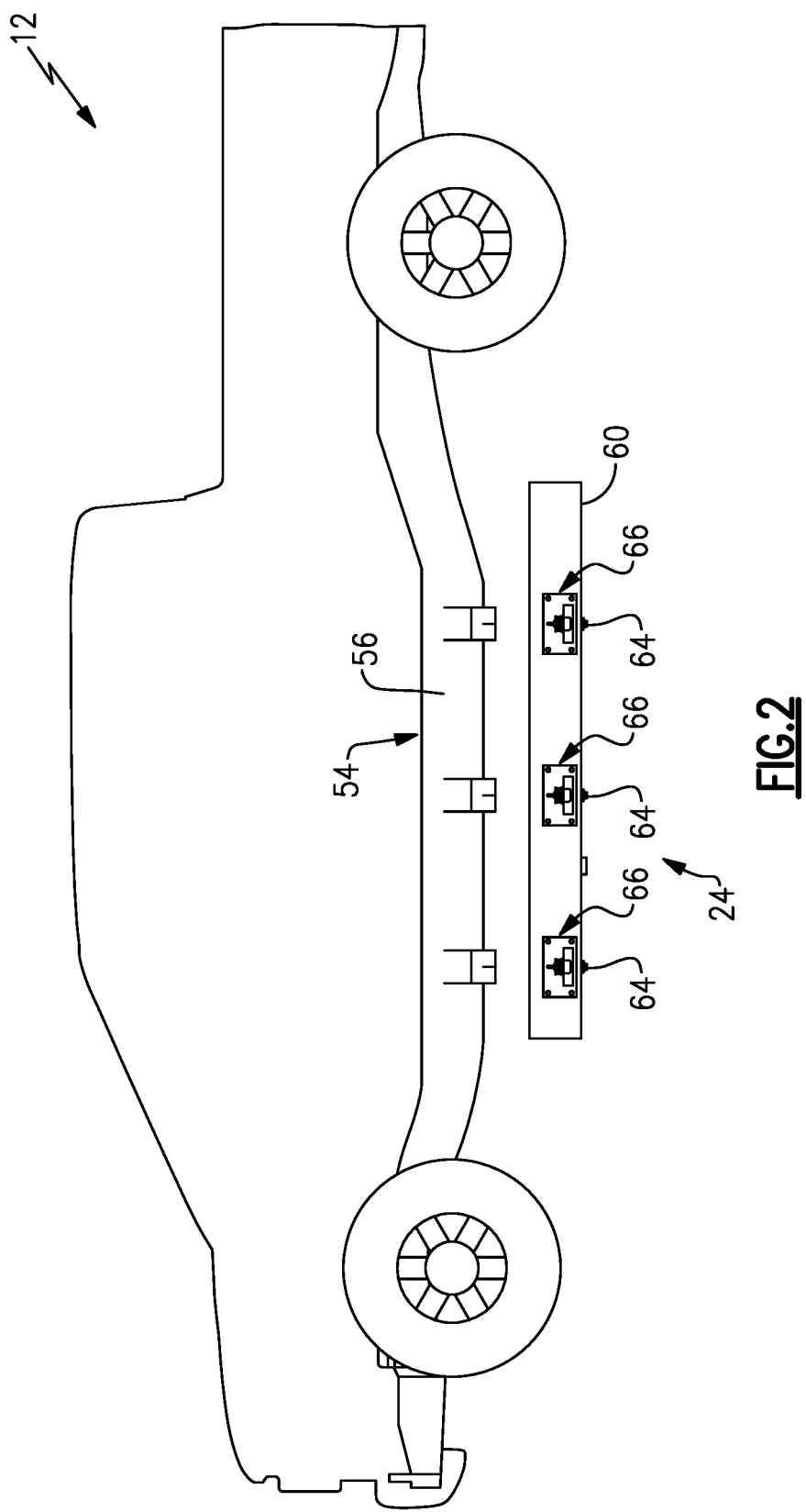
FIG. 2 illustrates a portion of the electrified vehicle, and in particular illustrates a portion of a vehicle frame and a battery pack.

FIG. 2 is side view of an electrified vehicle 12. In particular, FIG. 2 illustrates a portion of a frame 54 of the electrified vehicle 12. The frame 54 (sometimes referred to as a "vehicle frame") is the main supporting structure of the electrified vehicle 12, to which all other components are attached, either directly or indirectly. The frame 54 may be of a unibody construction, wherein the chassis and body of the vehicle are integrated into one another, or may be part of a body-on-frame construction. The frame 54 may be made of a metallic material, such as steel, carbon steel, or aluminum alloy, as examples.

The frame 54 includes a plurality of rails (sometimes referred to as "frame rails" or "beams"). FIG. 2 shows one such rail 56. The rail 56 is a structure extending along a side of the electrified vehicle 12. The electrified vehicle 12 typically includes two such rails on opposed sides of the electrified vehicle 12. The rails are connected together by other structures of the frame 54.

The rail 56, in this example, is an enclosed, hollow structure. The rail 56 may be formed of tubing. Alternatively, the rail 56 may be formed using an extrusion process. Further still, the rail 56 be formed of a piece of material that has been bent into four sides and welded closed where the ends meet. This disclosure is not limited to any particular method of forming the rail 56.

In this disclosure, the battery pack 24 is mounted to an underside of the electrified vehicle 12. In particular, the battery pack 24 is connected to the vehicle frame 54, and specifically the rail 56. The battery pack 24 in this example includes an enclosure, or housing 60, made of a metallic or polymer material, as examples. The housing 60 includes a plurality of tabs 62 (FIG. 6) projecting outward from the remainder of the housing 60. The tabs 62 are configured to cooperate with a respective fastener 64, which is connected to the rail 56. In this disclosure, each fastener 64 is indirectly connected to the rail 56 by way of a respective vibration isolator 66. The vibration isolators 66 are configured to permit some movement of the battery pack 24 relative to the rail 56. In this way, the battery pack 24 is isolated from at least some of the vibrations of the frame 54.

While three fasteners 64 and vibration isolators 66 are shown in FIG. 2, it should be understood that this disclosure extends to arrangements including two or more fasteners 64 and vibration isolators 66. For instance, the electrified vehicle 12 may include two opposed rails 56, and each of the rails 56 may include at least two vibration isolators 66. An example arrangement between the rail 56, fastener 64, and vibration isolator 66 will be discussed in detail below.

Figure 3:
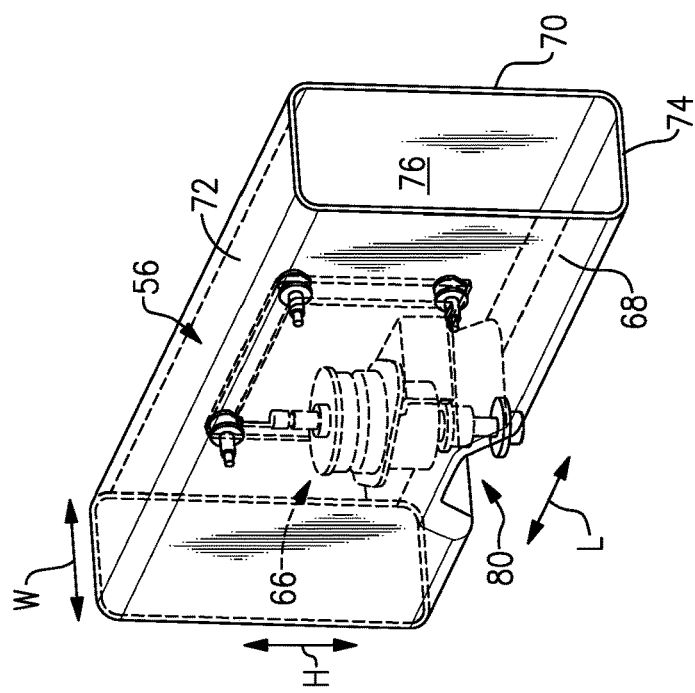
FIG. 3 is a perspective view of a portion of the vehicle frame with an example vibration isolator mounted within a rail of the vehicle frame.
Figure 4:
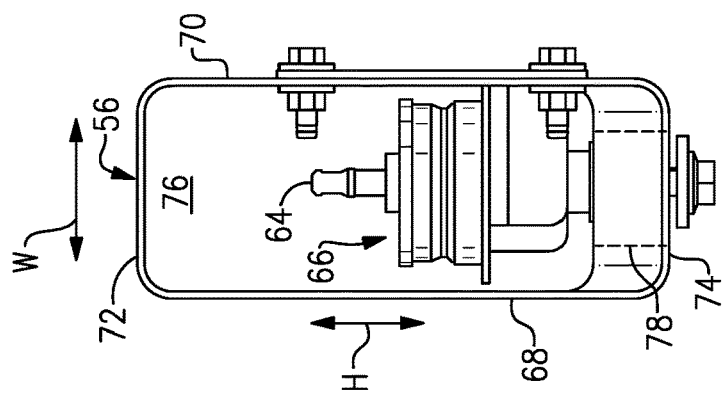
FIG. 4 is a front view of the portion of the vehicle frame and the vibration isolator of FIG. 3.

FIG. 3 is a perspective view of a portion of the rail 56 with an example vibration isolator 66 mounted within the rail 56, and FIG. 4 is a front view of the same. In FIG. 3, the rail 56 is drawn semi-transparent for ease of reference. As noted above, mounting the vibration isolator 66 within the rail 56 increases the amount of available packaging space relative to prior arrangements where the vibration isolator is mounted outside of the vehicle frame, for example.

With joint reference to FIGS. 3 and 4, the rail 56 has a length L, a width W, and a height H. The rail 56 includes two opposed side walls 68, 70 connected together at ends thereof by opposed vertical walls 72, 74. The side walls 68, 70 extend generally in the direction of the height H of the rail 56 and the walls 72, 74 extend generally in the direction of the width W. The walls 68, 70, 72, 74 may be integrally formed as a single structural piece. Together, the walls 68, 70, 72, 74 define an interior space 76 of the rail 56. In this example, the vibration isolator 66 is arranged entirely within the interior space 76.

The fastener 64 is connected to the vibration isolator 66 at a location within the interior space 76, and also extends partially outside the rail 56 for connection to the battery pack 24. In this example, the rail 56 includes a clearance slot 78 formed in the wall 74, which, in this example, is a lower wall of the rail 56. The clearance slot 78 is shown in phantom in FIG. 4, and is perhaps better seen in FIG. 6.

Adjacent the clearance slot 78, a recess 80 is formed in an exterior of the rail 56. With reference to the orientation of the rail in FIGS. 3 and 4, the recess 80 is beneath the wall 74. Adjacent the recess 80, the wall 74 is closer to the wall 72 than at other locations along the rail 56. Thus, adjacent the recess 80, the rail 56 exhibits a reduced height dimension H as compared to other locations along the length L of the rail 56. The clearance slot 78 and recess 80 may be formed using known manufacturing techniques.

Figure 5:
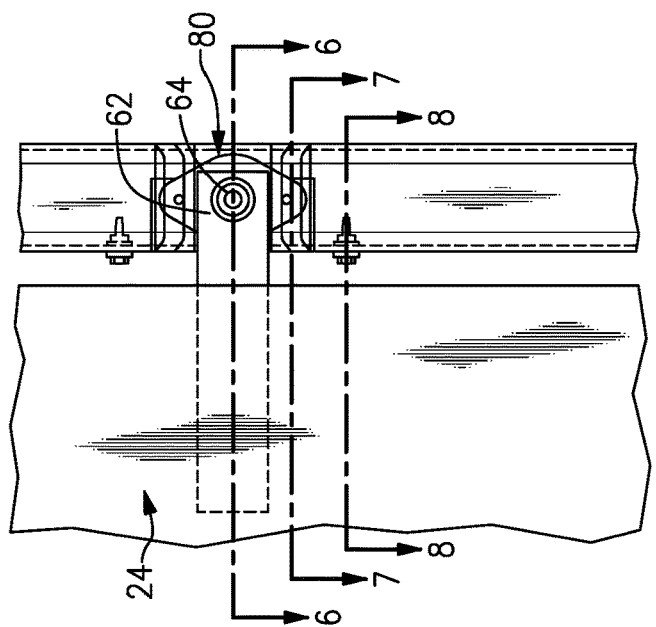
FIG. 5 is a bottom view of a portion of the vehicle frame and a portion of a battery pack.

FIG. 5 is a bottom view of the rail 56, and in particular illustrates the tab 62 of the battery pack 24 received at least partially within the recess 80. The recess 80 is not required in all examples. When present, however, the recess 80 facilitates assembly and alignment of the battery pack 24 relative to the rail 56.

Figure 8:
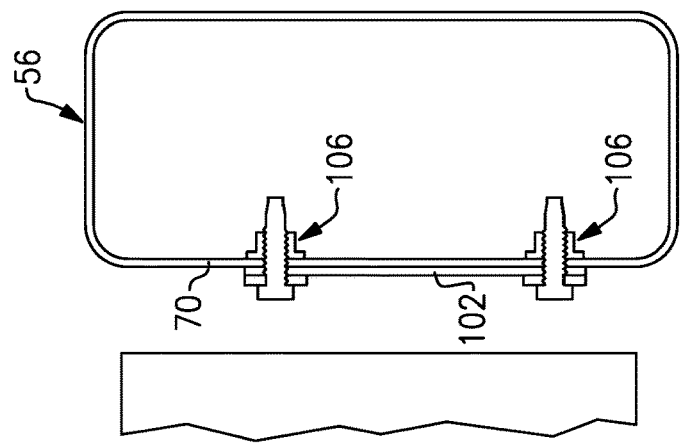
FIG. 8 is a cross-sectional view taken along line 8-8 of FIG. 5, and illustrates example fasteners connecting the panel to the access hole.
Figure 7:
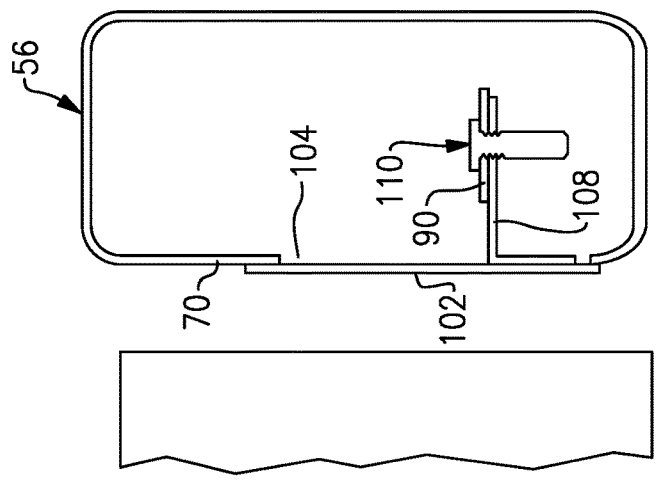
FIG. 7 is a cross-sectional view taken along line 7-7 of FIG. 5, and illustrates a panel arranged relative to an access hole.
Figure 6:
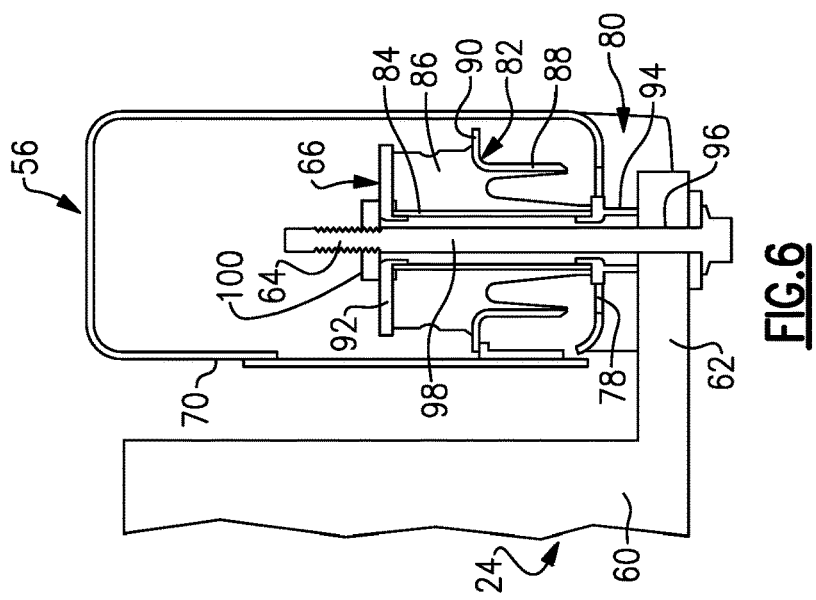
FIG. 6 is a cross-sectional view taken along line 6-6 of FIG. 5, and illustrates detail of an example vibration isolator and an example mounting arrangement.

FIGS. 6, 7, and 8 are cross-sectional views taken along lines 6-6, 7-7, and 8-8 from FIG. 5, respectively. Additional detail of the arrangement of the vibration isolator 66 relative to the rail 56 will now be described relative to FIGS. 6, 7, and 8.

With reference to FIG. 6, the vibration isolator 66 in this example is a damper, which isolates the battery pack 24 from at least some of the vibrations and other forces from the rail 56. If, for example, the rail 56 vibrates due to the electrified vehicle 12 traveling over rough terrain, the vibratory loads on the battery pack 24 will be dampened. The damping lengthens the time of transmitted shock forces and thus lowers a peak force of the load.

In this example, the vibration isolator 66 includes an outer bushing 82, an inner bushing 84, and a damping portion 86 generally between the outer bushing 82 and the inner bushing 84. The damping portion 86 secures the outer bushing 82 to the inner bushing 84. The inner bushing 84 is substantially cylindrical and receives a shaft of the fastener 64. The outer bushing 82 includes a first section 88, which is substantially cylindrical and concentric with the inner bushing 84, and a second section 90 projecting substantially normal to the first section 88.

The vibration isolator 66 further includes a cover plate 92 connected to a first end of the inner bushing 84, and a bushing 94 connected to a second, opposite end of the inner bushing 84. The bushing 94 projects through the clearance slot 78 in this example, and directly contacts the tab 62 on a surface opposite a head of the fastener 64. The damping portion 86 secures the cover plate 92 to the bushing 94.

The damping portion 86 may be, for example, a high-carbon rubber that is both elastomeric and, optionally, electrically conductive. In other examples, the damping portion 86 is not electrically conductive. The damping portion 86 may be made of other elastomeric materials, including, silicones, metal-filled silicones, etc. The damping portion 86 is compressible relative to the outer bushing 82 and the inner bushing 84, by way of the elastomeric material, which permits the outer bushing 82 to move and flex relative to the inner bushing 84. While one example vibration isolator 66 has been described, this disclosure extends to other vibration isolators that are mounted within a rail.

In this example, in order to connect the battery pack 24 to the rail 56, the fastener 64 is inserted through a hole 96 in the tab 62, and a shaft 98 of the fastener passes through the inner bushing 84. The shaft 98 extends above the cover plate 92, in this example, and a nut 100 is threaded onto the shaft 98 to connected the fastener 64 to the vibration isolator 66. The fastener 64 is tightened and torqued down relative to the nut 100 such that the nut 100 abuts against the cover plate 92 in order to hold the battery pack 24 in place relative to the rail 56. The nut 100 may be alternatively or additionally be welded to the cover plate 92. This disclosure extends to other techniques for mechanically coupling the fastener 64 to the vibration isolator 66.

With reference to FIG. 7, the vibration isolator 66, in turn, is mounted to the rail 56 by way of a panel 102, which covers an access hole 104 formed in one of the walls of the rail 56. In this example, the wall 70 includes the access hole 104. The panel 102 is sized such that it covers the access hole 104 to prevent ingress of any contaminants that may shorten the life of the vibration isolator 66. The panel 102 may be affixed to the rail 56 to cover the access hole 104 by way of one or more fasteners 106 (FIG. 8) and/or by welding, for example.

In this disclosure, a mounting plate 108 projects from the panel 102. The mounting plate 108 projects substantially normally from the panel 102. The mounting plate 108 may be formed integrally with the panel 102 or separately therefrom. In this disclosure, the vibration isolator 66 is connected to the mounting plate 108 via threaded fasteners 110, only one of which is shown in FIG. 7, although there may be two or more such fasteners. The threaded fasteners 110 connect the second section 90 of the outer bushing 82 to the mounting plate 108. The second section 90 and mounting plate 108 may be connected in other ways, such as by welding.

In use, the outer bushing 82 and the mounting plate 108 are rigidly connected, thus the outer bushing 82 moves together with the mounting plate 108. As the inner bushing 84 and the fastener 64 are rigidly connected (via cover plate 92 and nut 100, for example), the inner bushing 84 moves together with the fastener 64, and in turn the battery pack 24. The damping portion 86 permits these relative movements. Further, the damping portion 86 can permit the outer bushing 82 to rotate relative to the inner bushing 84. The damping portion 86 can also permit the outer bushing 82 to tilt relative to the inner bushing 84.

The vibration isolator 66 and associated mounting assembly isolates the battery pack 24 from vehicle frame loads. While one example mounting arrangement has been discussed herein, other arrangements for mounting the vibration isolator 66 within the rail 56 come within the scope of this disclosure. The teachings of this disclosure may be particularly applicable to vehicles that experience high loads and vibrations, such as sport utility vehicles (SUVs) and trucks, but, despite FIG. 2 illustrating a truck, this disclosure is not limited to such vehicles.

It should be understood that terms such as "side," "outward," "interior," etc., are directional terms made with reference to the normal operational attitude of the components being described. These directional terms are used for purposes of explanation only, and should not otherwise be considered to be limiting. Further, terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a frame including a rail;
a vibration isolator mounted within the rail;
a battery pack connected to the rail by way of the vibration isolator; and
a fastener, the battery pack connected to the vibration isolator by way of the fastener, wherein the fastener projects through a clearance slot formed in the rail.

2. The electrified vehicle as recited in claim 1, wherein the vibration isolator includes a damper.

3. An electrified vehicle, comprising:
a frame including a rail;
a vibration isolator mounted within the rail; and
a battery pack connected to the rail by way of the vibration isolator,
wherein the rail includes an access hole adjacent the vibration isolator, and
wherein the electrified vehicle further comprises a panel coupled to the rail to close the access hole.

4. The electrified vehicle as recited in claim 3, wherein the vibration isolator is mounted to the panel.

5. The electrified vehicle as recited in claim 4, further comprising a plate projecting from the panel, the vibration isolator mounted to the plate.

6. The electrified vehicle as recited in claim 5, wherein:
the vibration isolator includes a damping portion, an inner bushing, and an outer bushing, and
the outer bushing includes a section connected to the plate.

7. An electrified vehicle, comprising:
a frame including a rail;
a vibration isolator mounted within the rail;
a battery pack connected to the rail by way of the vibration isolator; and
a fastener, the battery pack connected to the vibration isolator by way of the fastener,
wherein the fastener projects through a clearance slot formed in the rail,
wherein the battery pack includes a housing having a tab in contact with the fastener.

8. An electrified vehicle, comprising:
a frame including a rail;
a vibration isolator mounted within the rail;
a battery pack connected to the rail by way of the vibration isolator; and
a fastener, the battery pack connected to the vibration isolator by way of the fastener,
wherein the fastener projects through a clearance slot formed in the rail,
wherein the battery pack includes a housing having a tab in contact with the fastener,
wherein the vibration isolator includes a plate generally opposite the tab, and
wherein a nut threaded onto the fastener abuts against the plate.

9. An electrified vehicle, comprising:
a frame including a rail;
a vibration isolator mounted within the rail;
a battery pack connected to the rail by way of the vibration isolator; and
a fastener, the battery pack connected to the vibration isolator by way of the fastener,
wherein the fastener projects through a clearance slot formed in the rail,
wherein the rail includes a length, a width, and a height, and
wherein the clearance slot is formed in a surface extending in a direction of the width of the rail.

10. The electrified vehicle as recited in claim 8, wherein an exterior surface of the rail includes a recess adjacent the clearance slot such that the rail exhibits a reduced height adjacent the clearance slot.

11. The electrified vehicle as recited in claim 10, wherein the tab is at least partially within the recess.

12. The electrified vehicle as recited in claim 1, wherein:
the frame includes two rails on opposite sides of the electrified vehicle, each of the rails includes at least two vibration isolators mounted therein, and the battery pack is connected to the rails by way of the respective vibration isolators.

13. A method, comprising:

mounting a battery pack to a rail of a vehicle frame by way of a vibration isolator within the rail, wherein the mounting step includes inserting the vibration isolator into the rail through an access hole formed in the rail; and covering the access hole with a panel, the vibration isolator mounted to the panel.

14. A method, comprising:

mounting a battery pack to a rail of a vehicle frame by way of a vibration isolator within the rail; and arranging a fastener through a clearance slot in the rail, the fastener connected to the vibration isolator and the battery pack.

15. A method, comprising:

mounting a battery pack to a rail of a vehicle frame by way of a vibration isolator within the rail;

arranging a fastener through a clearance slot in the rail, the fastener connected to the vibration isolator and the battery pack; and arranging the fastener adjacent a recess formed in an exterior surface of the rail.

16. The method as recited in claim 15, further comprising arranging a tab of the battery pack at least partially within the recess.

\* \* \* \* \*